(12) United States Patent
Bae et al.

(10) Patent No.: US 10,066,169 B2
(45) Date of Patent: Sep. 4, 2018

(54) MESOPOROUS COBALT-METAL OXIDE CATALYST FOR FISCHER-TROPSCH SYNTHESIS REACTIONS AND A PREPARING METHOD THEREOF

(71) Applicant: Research & Business Foundation Sungkyunkwan University, Suwon-si (KR)

(72) Inventors: Jong Wook Bae, Suwon-si (KR); Chang Il Ahn, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

(21) Appl. No.: 15/210,062

(22) Filed: Jul. 14, 2016

(65) Prior Publication Data
US 2017/0014808 A1  Jan. 19, 2017

(30) Foreign Application Priority Data
Jul. 14, 2015  (KR) .................. 10-2015-0100041

(51) Int. Cl.
  *C10G 2/00* (2006.01)
  *B01J 21/04* (2006.01)
  (Continued)

(52) U.S. Cl.
  CPC .............. *C10G 2/333* (2013.01); *C10G 2/332* (2013.01)

(58) Field of Classification Search
  CPC .......... B01J 21/04; B01J 21/06; B01J 21/066; B01J 21/08; B01J 23/42; B01J 23/75;
  (Continued)

(56) References Cited

U.S. PATENT DOCUMENTS 4,837,193 A * 6/1989 Akizuki .................. B01J 23/85
                                              208/112
6,319,872 B1 * 11/2001 Manzer ................ B01J 29/0325
                                              502/60
(Continued)

OTHER PUBLICATIONS

Bae, J., "Chemical Transformations of alternative feedstock using mesoporous catalysts," School of Chemical Engineering Sungkyunkwan University, Korea, 2015 (72 pages).
(Continued)

*Primary Examiner* — Cam N. Nguyen
(74) *Attorney, Agent, or Firm* — NSIP Law

(57) ABSTRACT

The present invention relates to a mesoporous cobalt-metal oxide catalyst for the Fischer-Tropsch synthesis and a method of preparing the same. The mesoporous cobalt-metal oxide catalyst for the Fischer-Tropsch synthesis of the present invention can very stably maintain the mesoporous structure even under a $H_2$-rich high-temperature reduction condition and under a reaction condition of the low-temperature Fischer-Tropsch synthesis, easily transport reactants to the active site of the catalyst due to structural stability, and facilitate the release of heavier hydrocarbon products after production thereof. Additionally, unlike the conventional cobalt-based catalysts which are prepared by adding various co-catalysts for the purpose of improving reducibility, activity, selectivity and increasing thermal stability, etc., the mesoporous cobalt-metal oxide catalyst for the Fischer-Tropsch synthesis can constantly maintain conversion and selectivity at high levels without further requiring co-catalysts and thus it can be very effectively used for the Fischer-Tropsch synthesis.

18 Claims, 4 Drawing Sheets

(51) Int. Cl.
  *B01J 21/06* (2006.01)
  *B01J 21/08* (2006.01)
  *B01J 23/42* (2006.01)
  *B01J 23/75* (2006.01)
  *B01J 23/89* (2006.01)
  *B01J 35/10* (2006.01)
  *B01J 29/03* (2006.01)

(58) Field of Classification Search
  CPC .............. B01J 23/8913; B01J 29/0325; B01J 35/1014; B01J 35/1023; B01J 35/1061; C10G 2/332; C10G 2/333
  See application file for complete search history.

(56) References Cited

U.S. PATENT DOCUMENTS

| | | | | |
|---|---|---|---|---|
| 7,442,290 B2* | 10/2008 | Shan | ............... | B01J 21/04 208/108 |
| 7,655,136 B2* | 2/2010 | Euzen | ............... | B01J 21/12 208/114 |
| 7,663,011 B2* | 2/2010 | Shan | ............... | B01J 21/12 208/118 |
| 7,700,519 B2* | 4/2010 | Nirisen | ............... | B01D 53/8628 423/235 |
| 7,713,911 B2* | 5/2010 | Wakamatsu | ......... | B01J 23/8913 502/245 |
| 7,732,500 B2* | 6/2010 | Lok | ............... | B01J 23/75 502/327 |
| 7,846,977 B2* | 12/2010 | Baijense | ............... | B01J 23/60 502/253 |
| 8,053,481 B2* | 11/2011 | Ayasse | ............... | B01J 23/8896 518/700 |
| 8,071,655 B2* | 12/2011 | Diehl | ............... | B01J 21/12 502/242 |
| 8,084,387 B2* | 12/2011 | Jun | ............... | B01J 23/75 423/625 |
| 8,097,555 B2* | 1/2012 | Costa | ............... | B01J 23/6527 502/242 |
| 8,425,762 B2* | 4/2013 | McCarthy | ............... | B01J 29/0325 208/142 |
| 8,747,652 B2* | 6/2014 | Bonduelle | ............... | B01J 29/041 208/110 |
| 8,992,870 B2* | 3/2015 | Nirisen | ............... | B01D 53/8628 423/235 |
| 9,290,700 B2* | 3/2016 | Sineva | ............... | C10G 2/332 |
| 9,359,271 B2* | 6/2016 | LeViness | ............... | B01J 23/8913 |
| 9,458,387 B2* | 10/2016 | Nagayasu | ............... | B01J 21/066 |
| 9,486,789 B2* | 11/2016 | Decottignies | ......... | B01J 27/1853 |
| 9,512,365 B2* | 12/2016 | Decottignies | ............... | C10G 2/33 |
| 9,707,546 B2* | 7/2017 | Richard | ............... | B01J 23/8986 |
| 2005/0201920 A1* | 9/2005 | Shan | ............... | B01J 21/06 423/335 |
| 2014/0031194 A1* | 1/2014 | Jothimurugesan | ... | B01J 29/7669 502/73 |
| 2015/0353845 A1* | 12/2015 | Lanci | ............... | B01J 31/28 585/258 |
| 2017/0036198 A1* | 2/2017 | Rao | ............... | B01J 23/75 |

OTHER PUBLICATIONS

Ahn, C. et al., "Enhanced Catalytic activity by stabilized mesoporous, Co3O4 structure," School of Chemical Engineering Sungkyunkwan University, Korea, 2015 (1 page).

Khodakov, A. et al., "Advances in the Development of Novel Cobalt Fischer-Tropsch Catalysts for Synthesis of Long-Chain Hydrocarbons and Clean Fuels," Department of Chemical Engineering Sichuan University, China, Chemical Review 2007 (pp. 1692-1744).

Khodakov, Andrei Y, et al., "Advances in the Development of Novel Cobalt Fischer-Tropsch Catalysts for Synthesis of Long-Chain Hydrocarbons and Clean Fuels", *Chem. Rev.* 107, 2007 (pp. 1692-1744).

Bordoloi, Ankur, et al., "Catalytic Behaviour of Mesoporous Cobalt-Aluminum Oxides for CO Oxidation", *Journal of Catalysts*, vol. 2014, Oct. 1, 2014 (9 pages).

Koo, Hyun M., "The Fischer-Tropsch synthesis over cobalt catalysts supported on mesoporous materials" *School of Chemical Engineering Sungkyunkwan University*, 2014 (2 pages in English and 101 pages in Korean).

Korean Office Action dated Sep. 12, 2017 in corresponding Korean Patent Application No. 10-2016-0089396 (6 pages in Korean).

* cited by examiner

[FIG. 1]
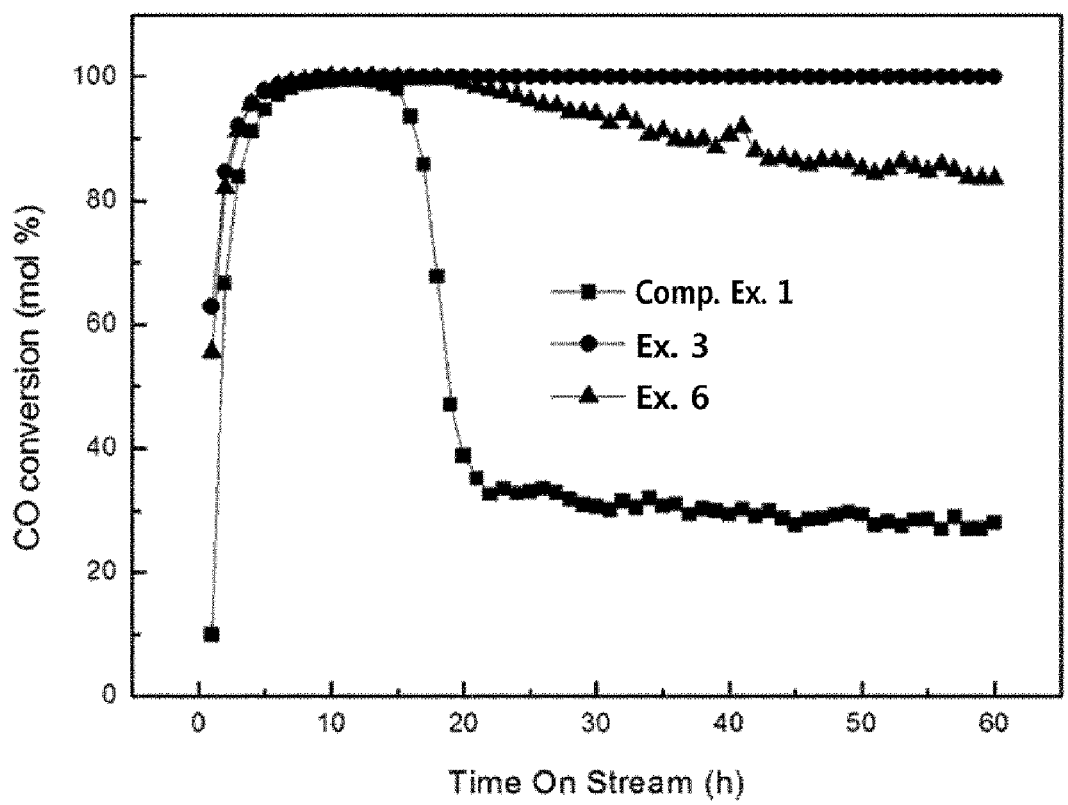

[FIG. 2]
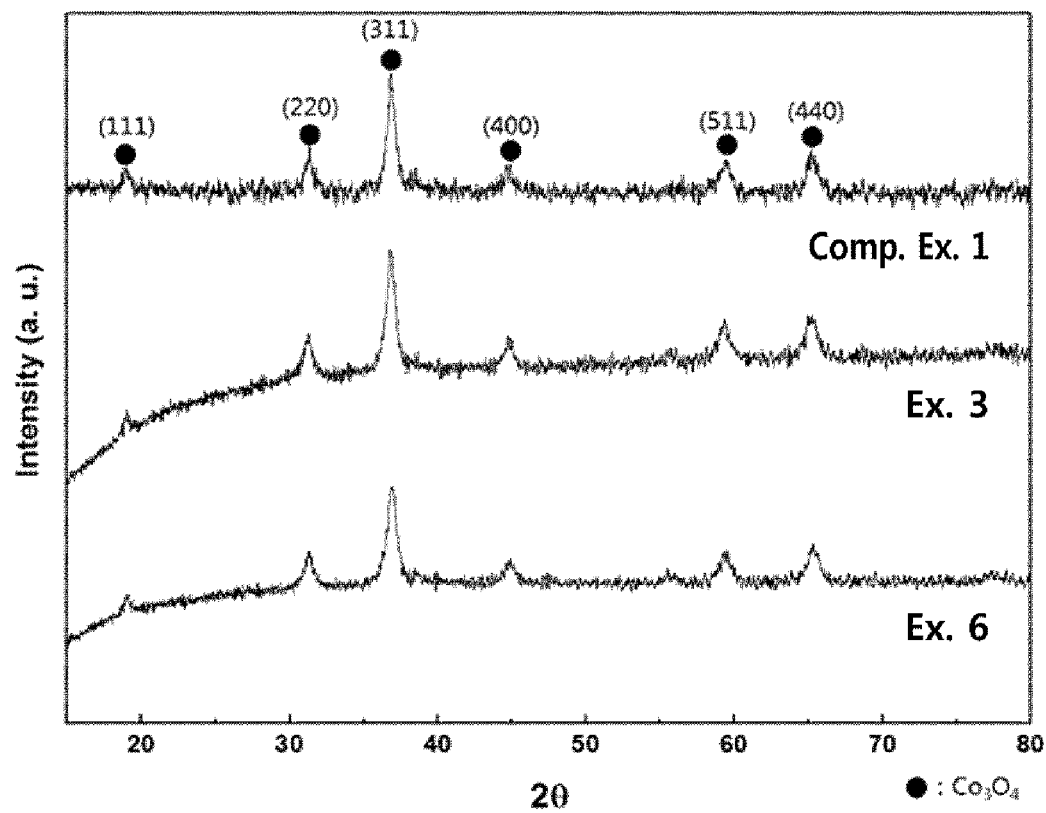

[FIG. 3]
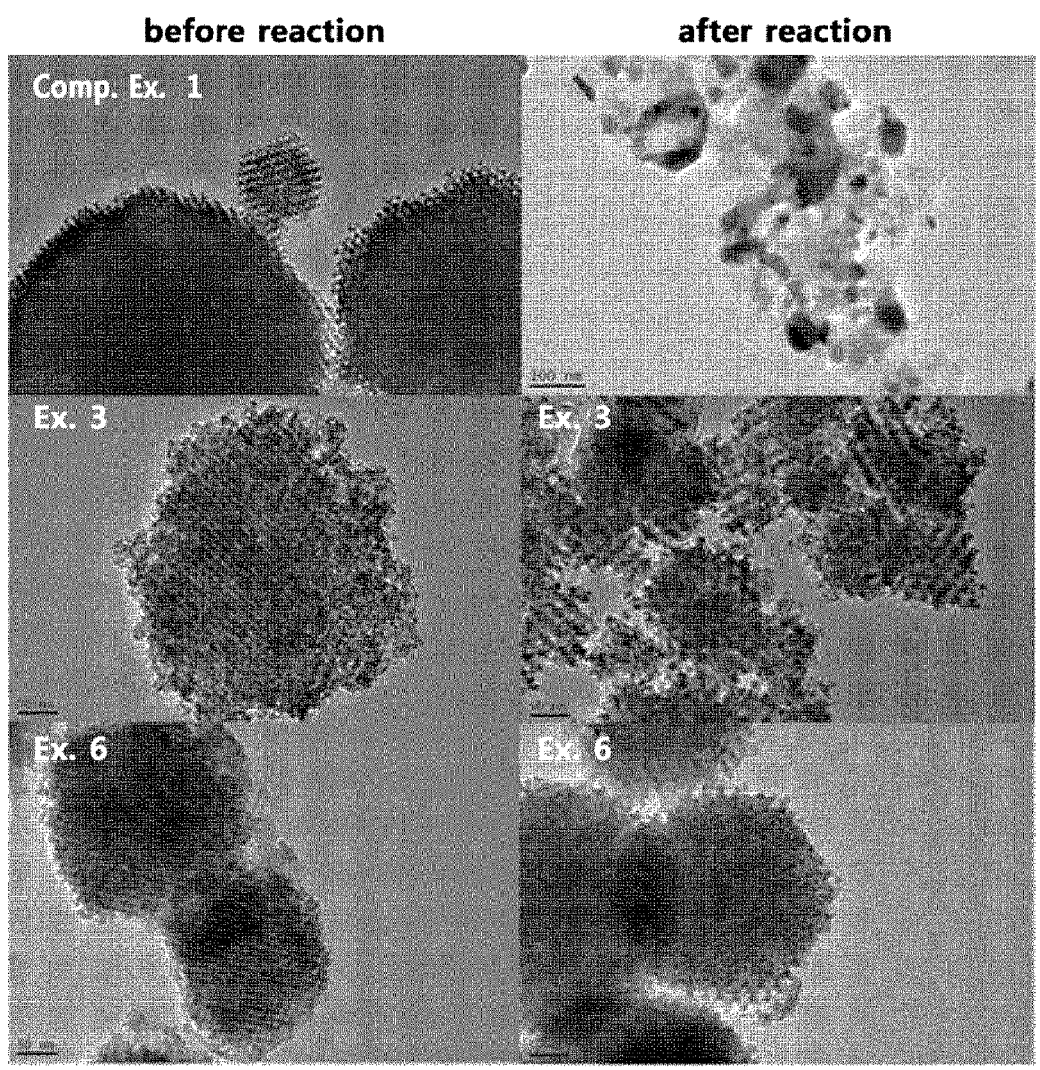

[FIG. 4]
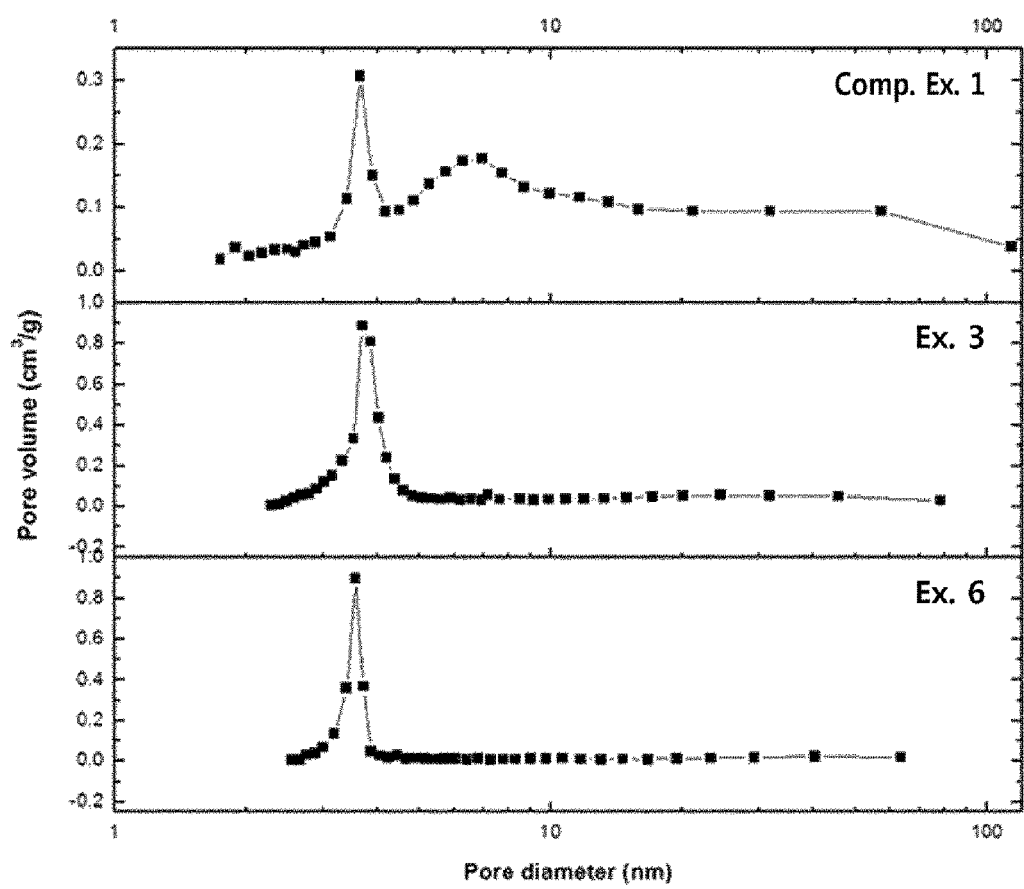

MESOPOROUS COBALT-METAL OXIDE CATALYST FOR FISCHER-TROPSCH SYNTHESIS REACTIONS AND A PREPARING METHOD THEREOF

CROSS-REFERENCE TO RELATED APPLICATION(S)

This application claims the benefit under 35 USC 119(a) of Korean Patent Application No. 10-2015-0100041 filed Jul. 14, 2015, in the Korean Intellectual Property Office, the entire disclosure of which is incorporated herein by reference for all purposes.

TECHNICAL FIELD

The present invention relates to a mesoporous cobalt-based catalyst for Fischer-Tropsch synthesis and a method of preparing the same.

BACKGROUND ART

Fischer-Tropsch (hereinafter F-T) synthesis was first developed by German chemists Hans Tropsch and Franz Fischer in 1925, and is a method for preparing a broad range of hydrocarbons using syngas ($H_2$+CO) synthesized from major raw materials such as coal, natural gas, gas hydrate, or biomass by a reforming reaction. The process, a key component of the 'gas to liquid (GTL)' technology, usually accompanies side reactions such as the water-gas shift reaction, methanation reaction, Boudouard reaction, etc., but the main reaction is a polymerization reaction of carbon chains on the surface of a catalyst. There has always been a necessity for the technology of artificial oil production due to the threat of oil depletion, frequent changes in oil prices due to the political or economical situations of oil-producing countries, etc. Recently, the technology has drawn much attention as a technology to substitute oil as it considered to be a technology capable of producing a clean liquid fuel without a sulfur-containing component by utilizing the abundant feedstock such as the shale gas being newly discovered, and commercialization by major oil companies is underway.

Examples of the transition metals which are well known to show activities in the F-T synthesis reaction may include cobalt, iron, nickel, ruthenium, etc. However, Ru is too expensive to be used as a commercial catalyst (about 50,000 times more expensive than Fe) and Ni has a problem in that it has an extremely high selectivity for methanation, and thus only Fe and Co are used commercially.

In particular, a Co catalyst has a disadvantage in that it is about 200 times more expensive than a Fe catalyst. However, the Co catalyst is relatively cheap compared to noble metal catalysts and has higher catalytic activity in the F-T synthesis reaction than noble metal catalysts, and also has advantages in that it has a long life and high CO conversion, can inhibit the water-gas shift reaction, increase the selectivity of linear hydrocarbons, etc. Furthermore, the Co catalyst can show catalytic activities in the F-T synthesis at a temperature range lower than the Fe catalyst, and thus the Co catalyst has a large advantage as a catalyst for the F-T synthesis in terms of energy efficiency compared to the Fe catalyst.

However, since the activity of the Co catalyst is known to mainly depend on the number of active sites exposed to the surface, a process of uniformly dispersing Co, an active material, on top of a support having a very wide specific surface area is essentially required for obtaining a high catalytic activity, and thus a mesoporous material with a medium pore size is used as the most suitable material for the establishment of high dispersibility or a wide specific surface area of the catalyst.

DISCLOSURE

Technical Problem

The present invention provides a cobalt-based catalyst for the F-T synthesis which secures the structural stability of the catalyst having a main framework of a mesoporous structure mainly containing cobalt and which does not require a co-catalyst, and a method of preparing the same.

Technical Solution

A first aspect of the present invention provides a mesoporous cobalt-based catalyst for the Fischer-Tropsch synthesis comprising a main framework of a mesoporous structure, wherein the main framework is made of cobalt oxide, zirconia and/or alumina which are uniformly mixed.

A second aspect of the present invention provides a method for preparing a mesoporous cobalt-based catalyst for the Fischer-Tropsch synthesis of the first aspect, comprising: (1) preparing a mixed solution in which a cobalt precursor, a zirconium precursor, and/or an aluminum precursor are dissolved; (2) filling the inside of the pores of a mesoporous template with the mixed solution in step (1) followed by drying and calcination; and (3) removing the mesoporous template to form the main framework of a mesoporous structure in which cobalt oxide, zirconia, and/or alumina are uniformly mixed.

A third aspect of the present invention provides a method of preparing middle distillate-based liquid hydrocarbons from syngas by the low-temperature Fischer-Tropsch synthesis, comprising: i) applying the mesoporous cobalt-based catalyst for the Fischer-Tropsch synthesis of the first aspect to a fixed-bed reactor for the Fischer-Tropsch synthesis; ii) activating the catalyst by reducing under a high-temperature hydrogen atmosphere; and iii) carrying out the Fischer-Tropsch synthesis using the activated catalyst for the low-temperature Fischer-Tropsch synthesis.

Hereinbelow, the present invention will be described in detail.

As used herein, the term 'low-temperature Fischer-Tropsch Synthesis (LTFT)' may be carried out at a temperature range of 200° C. to 350° C., in particular at a low temperature range of 200° C. to 250° C., and under a pressure range of 10 bar to 30 bar, in particular under a pressure range of 15 bar to 25 bar. Also, among cobalt and iron, which are the transition metals frequently used in the F-T synthesis, cobalt may show an activity in the temperature range of this reaction.

In general, a catalyst is largely composed of a support, an active material, and a promoter. Active materials showing a catalytic activity, that is, the transition metals, are expensive in most cases, and thus they are often prepared by uniformly dispersing in the form of nanoparticles on the surface of inorganic oxides, which have excellent thermal-mechanical properties, in order to secure economy and efficiency.

Inorganic oxide-based substances which do not have a catalytic activity ($Al_2O_3$, $SiO_2$, $TiO_2$, $ZrO_2$, and $CeO_2$) are commonly used as a support. When these oxide supports are synthesized to have a well-developed pore structure and used, the number of active sites increases, thereby not only rapidly increasing the catalytic activity, but also significantly decreasing the likelihood of restricting mass transfer which could occur during the processes when reactants reach the active site and when reaction products are released out of the catalyst from the active sites. Due to such advantages, these substances are frequently used as a support of catalysts and are highly and frequently applied in the field of catalysis such as mesoporous silica (MCM-41, MCM-48, SBA-15, KIT-6, etc.). The mesoporous silica itself is suitable as a support, but when the well-developed pores of the mesoporous silica are used as a type of template for synthesizing new substances, the mesoporous silica may have a role as a cross-linker in creating new mesoporous materials through two processes.

Catalysts in which active materials are supported in a support have an advantage of relatively cheap production cost, and a disadvantage in that uniform dispersion of the active materials is necessary, and if such disadvantage is not resolved, the aggregation of the active materials on the surface is accelerated, inducing a rapid decrease in the catalyst lifetime. Further, when the amount of active materials used is relatively small and the active materials are lumped together rather than uniformly dispersed, the number of active sites where reactions occur decreases, and a small number of exposed active sites are covered with hydrocarbons produced during the reaction, and thus, there are often times when the activity of the catalysts is easily lost.

Meanwhile, the materials which show an activity in the F-T synthesis reaction, which is a hydrogenation reaction of carbon monoxide, are the transition metals and not metal oxides, and therefore, Co catalysts for the F-T synthesis are prepared in the form of transition metal oxides, and a hydrogen pretreatment process (reduction), which converts the transition metal oxides to the transition metals, is essentially carried out under a high-temperature hydrogen atmosphere. In the reduction process, cobalt oxide ($Co_3O_4$) undergoes a phase transition to Co via an intermediate stage (CoO), and herein, the mesoporous structure is partially collapsed due to a chemical structural change, and further, the collapse of the mesoporous structure is accelerated due to the aggregation of cobalt (calcination) during the reduction or the F-T synthesis reaction, which is problematic.

If the framework of the mesoporous structure itself is composed of cobalt oxides, the number of active sites where reactions occur significantly increases, which may have a positive influence on the catalytic activity, but when the structure starts to collapse, the aggregation of cobalt becomes even more prominent and the structural stability cannot be guaranteed, compared to the catalysts with a general form, in which cobalt is supported on the support, and thus, the effect on the reduction of catalytic activity and the catalyst lifetime is very fatal.

Therefore, the present invention provides a catalyst which not only maintains a stable structure, but also can prevent the structural collapse caused by a chemical change of metal oxides to metals during the reduction for catalyst activation when cobalt oxide forms the framework of the mesoporous structure in the F-T synthesis catalysts.

The present invention synthesizes the mesoporous framework, in which zirconia and/or alumina and cobalt oxide are uniformly mixed, in order to increase the structural stability of the mesoporous cobalt oxide catalyst, or prepares the catalyst by further adding components of an inactive structural promoter to the surfaces and the pores of the synthesized mesoporous framework via impregnation. As a result, it was confirmed that the structure of the mesoporous framework is stably maintained, and the activity and stability of the catalyst for the low-temperature Fischer-Tropsch synthesis are increased, thereby completing the present invention.

Specifically, in order to overcome the catalyst deactivation, which is the problem found in the conventional catalysts for the low-temperature Fischer-Tropsch synthesis, meso-hybrid cobalt metal oxide catalysts (meso-$CoM_{0.25}O_x$), in which a highly-ordered mesoporous structure is developed, was synthesized, and a small amount of alumina ($Al_2O_3$) was added as a structural promoter, which is a supporting material for the surfaces of the catalyst framework and the framework inside of mesopores, in order to maintain the stability of the mesoporous structure produced. As a result, it was found that the mesoporous structure can be stably maintained even under a high-temperature reduction atmosphere and under the low-temperature F-T synthesis, and that the catalytic activity and the inhibition of deactivation can be improved by the reaction and analysis results. The present invention is based on these findings.

Therefore, the mesoporous cobalt-based catalyst for the Fischer-Tropsch synthesis according to the present invention is characterized as having a main framework of the mesoporous structure in which cobalt oxide and zirconia and/or alumina are uniformly mixed. Preferably, the main framework has a highly-ordered mesoporous structure. The mesoporous structure may be in the scale of several nanometers.

The mesoporous cobalt-based catalyst for the Fischer-Tropsch synthesis according to the present invention may be synthesized or selected to have a mesoporous size enabling a selective formation or release of a desired reaction product of the Fischer-Tropsch synthesis. Therefore, although cobalt-based catalysts are generally prepared by adding various co-catalysts for the purpose of improving reducibility, activity, and selectivity and increasing thermal stability, etc., the mesoporous cobalt-based catalyst for the Fischer-Tropsch synthesis can constantly maintain conversion and selectivity without further requiring co-catalysts, and thus it can be very effectively used for the Fischer-Tropsch synthesis.

According to one embodiment of the present invention, the main framework of the mesoporous structure mainly includes the components represented by Formula 1 below:

$$CoM_aO_b \qquad \text{[Formula 1]}$$

wherein M is Zr and/or Al; and a or b is a molar ratio, wherein a and b are in the ranges of $0.1 \leq a \leq 0.35$ and $1 \leq b \leq 4$, respectively.

The compound of Formula 1 may refer to a compound in which cobalt oxide and a part thereof is substituted with zirconia and/or alumina.

To prevent the collapse of the mesostructure, the ratio of Al and Zr oxides in the catalyst may be in the range of 0.1 to 0.35 mol relative to 1 mol of cobalt metal, preferably in the form of CoM(Zr or Al oxide)$_y$O$_x$ (herein, y=0.1 to 0.35).

Further, the mesoporous cobalt-based catalyst having a main framework of the mesoporous structure, in which cobalt oxide and zirconia and/or alumina are uniformly mixed according to the present invention, further impregnates alumina as a structural promoter in the pores, and thus, it may be more likely that structural collapse would be prevented.

The catalyst of the present invention may further include alumina or a metal mixture of alumina-platinum, wherein the metal mixture of alumina-platinum may further be included in an amount of 12 wt % or less relative to the total weight of the mesoporous cobalt-metal oxide catalyst.

The alumina or the metal mixture of alumina-platinum according to the present invention may be impregnated on the surface of the mesoporous cobalt according to the present invention or in the pores thereof, and thus can be used as a structural promoter which has an effect of maintaining the structural stability of the mesoporous cobalt-based catalyst under a reducing atmosphere.

When the alumina or the metal mixture of alumina-platinum is impregnated in an amount of 12 wt % or less relative to the total weight of the mesoporous cobalt-based catalyst, preferably between 2 wt % and 12 wt %, the mesoporous structure can be stably maintained even during the chemical change from the transition metal oxides to the transition metals under a reducing atmosphere, the rapid deactivation of the catalyst which occurs when the mesoporous structure collapses can be inhibited, and the catalytic activity can be very stably maintained, whereas when the weight exceeds 12 wt %, the size of the pores of the catalyst surface varies, and the size of the active material varies according to the size of the pores, thereby reducing the catalytic activity, which can be problematic.

The main framework of mesoporous cobalt-based catalyst for the Fischer-Tropsch synthesis is made of $CoZr_aO_b$, $CoAl_aO_b$, $Al_2O_3$—$COZr_aO_b$, $Al_2O_3$—$CoAl_aO_b$, or $Al_2O_3$—Pt—$CoZr_a\ O_b$ (wherein $0.1 \leq a \leq 0.35$ and $1 \leq b \leq 4$).

The mesoporous structure of the mesoporous cobalt-based catalyst for the Fischer-Tropsch synthesis may be prepared by the nano-casting method. The inside of mesopores of a template may form a main framework of the catalyst corresponding thereto. For example, a mesoporous silica having pores in meso-scale, which are highly ordered in two- or three-dimensions, can be used as a template. The main framework of the highly-ordered mesoporous catalyst, which is mainly composed of catalytic active materials, may be formed by infiltrating a transition metal precursor dissolved in a solvent into the inside of the well-developed mesopores of the mesoporous silica having highly-ordered mesopores, followed by drying the solvent and calcination, and removing the silica. The catalyst structure, which is synthesized using the mesoporous silica in the form of a mold, may be called a negative replica due to the unique characteristic of a form of an intaglio of the mesoporous silica.

In the present invention, the mesoporous silica may be used as a hard template. The three-dimensional mesoporous silica, which is highly ordered and has a well-developed mesopore structure, may be preferably used as a template. The non-limiting examples of the mesoporous silica include KIT-6, SBA-15, SBA-16, MCM-41, MCM-48, HMS, AMS-8, AMS-10, FDU-2, FDU-12, or a combination thereof. The mesoporous template used may be directly synthesized, or a commercially available product can be purchased and used. For example, in the case of KIT-6, the molar ratio of a sample used in the preparation of a reaction solution may preferably be, in general, $TEOS/P123/HCl/H_2O/BuOH=1/0.017/1.83/195/1.31$. The specific surface area of the mesoporous silica synthesized with the molar ratio ranges from about 580 $m^2/g$ to 630 $m^2/g$, and the average diameter of the pores produced ranges from about 5 nm to 8 nm, and thus, it enables the synthesis of KIT-6, which is a mesoporous silica having a highly-ordered three-dimensional mesoporous structure.

The size of mesopores in the mesoporous cobalt-based catalyst prepared by the nano-casting method may be almost identical to the thickness of the framework of the template. For example, the specific surface area of the mesoporous cobalt-based catalyst prepared using the mesoporous silica with a broad specific surface area may be in the range of 45 $m^2/g$ to 200 $m^2/g$ and the average diameter of pores may be in the range of 4 nm to 8 nm.

When the catalyst is prepared using a template having a highly-ordered mesoporous structure, the mesoporous cobalt-based catalyst for the Fischer-Tropsch synthesis is very advantageous in releasing hydrocarbons produced during the reaction because the highly-ordered microporous structure is well developed on the surface, and thus, the likelihood that the active sites of the catalyst on the surface are blocked by the product is low, and even if some active sites are blocked by the hydrocarbon produced, the possibility of catalytic deactivation decreases as many active sites exist in the framework itself. Such unique characteristic of the catalyst may contribute significantly to increasing the conversion of CO hydrogenation and stably maintaining the activity thereof.

Meanwhile, the framework of the mesoporous-cobalt catalyst (meso-$Co_3O_4$) is mainly composed of cobalt oxides, and thus, there is a high chance that the collapse of the mesoporous structure is accompanied because a chemical change from metal oxides to metals occurs under a $H_2$-rich condition from the catalytic reductions or the Fischer-Tropsch synthesis. However, the catalyst according to the present invention has cobalt oxide framework, with a non-reducing oxide in the mesoporous framework, and thus, even when a phase transition from cobalt oxides to cobalt metals occurs under a $H_2$-rich reducing condition, the mesoporous framework may be tightly maintained without collapse. Therefore, the structural collapse, which is the fatal problem in the mesoporous oxide catalyst, may be prevented. The non-reducing metal oxides may preferably be oxides of Al and/or Zr.

In addition, the alumina as structural promoter may be impregnated in the pores and on the surface in an amount of 2 wt % to 15 wt % relative to the total weight of the catalyst in the mesoporous cobalt-based catalyst for the Fischer-Tropsch synthesis according to the present invention. When the alumina is impregnated within the range, the mesoporous structure can be stably maintained during the chemical change from the transition metal oxides to the transition metals under a reducing atmosphere, and when the mesoporous structure collapses, the rapid deactivation of the catalyst can be inhibited and the high catalytic activity can be very stably maintained.

When alumina, which is a structural promoter, is added to the mesoporous catalyst prepared above in the form of impregnation, the specific surface area and the average diameter of the pore generally decreases, but the difference is not significant, and the specific surface area of the meso-hybrid cobalt metal oxide catalyst may be in the range of 40 $m^2/g$ to 110 $m^2/g$ and the average diameter of the pore may be in the range of 3 nm to 11 nm.

Herein, if the specific surface area of the catalyst is 40 $m^2/g$ or less, it may be problematic as the surface area, which is the target site of the catalyst, gets smaller, thereby decreasing the catalytic activity, and in the case of a mesoporous cobalt oxide synthesized by the nano-casting method, the specific surface area may be as near as 110 $m^2/g$ at maximum if the porous structure is well developed.

Meanwhile, the activity of the catalyst for the Fischer-Tropsch synthesis for preparation of liquid hydrocarbons from syngas and the selectivity of the products may vary depending on the pore structure of the catalyst particles, which have an influence on the reactants as they approach the active sites. Specifically, when the average diameter of the pore of the mesoporous cobalt-based catalyst is 3 nm or less, in which the pores are thin and present in a large amount, the surface area and the number of active sites increase, but the selectivity of liquid hydrocarbons decreases as the diffusion speed of the reactants slows, whereas when the average diameter exceeds 11 nm, the surface area, which is the target site of the catalyst, becomes relatively small, and the catalytic activity decreases, which is problematic. Therefore, the size and distribution of the catalyst pore are important factors to be considered when selecting a catalyst.

According to the present invention, the catalyst may be used for the low-temperature Fischer-Tropsch synthesis of below 280° C.

Conventionally, when the reaction temperature of the F-T synthesis is below 280° C., it is classified as the low-temperature Fischer-Tropsch synthesis, whereas when the reaction temperature of the F-T synthesis is 300° C. or higher, it is classified as the high-temperature Fischer-Tropsch synthesis. The mesoporous cobalt-based catalyst according to the present invention is suited for the low-temperature Fischer-Tropsch synthesis in which the F-T synthesis is carried out at temperature below 280° C., preferably at a temperature range of 200° C. to 250° C. In one embodiment, the F-T synthesis was carried out at 250° C. using the mesoporous cobalt-based catalyst according to the present invention, and as a result, the CO conversion was increased by 70% or more and the selectivity of olefin was reduced by 50% or less.

The method for preparing a mesoporous cobalt-based catalyst for the Fischer-Tropsch synthesis comprises (1) preparing a mixed solution in which a cobalt precursor, a zirconium precursor, and/or an aluminum precursor are dissolved;

(2) filling the inside of the pores of the mesoporous template with the mixed solution in step (1) followed by drying and calcination; and (3) removing the mesoporous template.

A chloride salt, bromide salt, acetate salt, etc. may be used as the cobalt precursor used in step (1), and preferably a nitrate salt may be used. Specifically, the cobalt precursor may include cobalt chloride ($CoCl_2 \cdot 6H_2O$), cobalt acetate (($CH_3COO)_2Co \cdot 4H_2O$), and cobalt nitrate ($Co(NO_3)_2 \cdot 6H_2O$).

The zirconium precursor or zirconia precursor may include zirconium oxynitrate hydrate ($ZrO(NO_3)_2 \cdot xH_2O$), zirconium chloride octahydrate ($ZrOCl_2 \cdot 8H_2O$), and zirconium acetate hydroxide (($CH_3CO_2)_xZr(OH)_y$).

The aluminum precursor or alumina precursor may include aluminum nitrate nonahydrate ($Al(NO_3)_3 \cdot 9H_2O$), aluminum chloride hexahydrate ($AlCl_3 \cdot 6H_2O$), and aluminum acetate ($Al(OH)(C_2H_3O_2)_2$).

The solvent in the mixed solution of step (1) above may be at least one selected from distilled water, methanol, ethanol, and ethylene glycol.

The cobalt precursor and the zirconium precursor and/or the aluminum precursor in step (1) may be mixed in a weight ratio of 1:0.1 to 1:0.3.

Step (2), the mesoporous template powder is mixed with an aqueous solution containing a cobalt precursor and a zirconium or aluminum precursor, and the mixture is stirred well such that the aqueous solution of the precursors can infiltrate into the template powder, and the step can be carried out as rapidly as possible in order to prevent the infiltration of moisture in the air into the inside of the micropores. If the aqueous solution of the metal precursors infiltrates into the inside of mesopores of the mesoporous template by capillary action, the evaporation of the solvent is carried out slowly at 80° C., which is lower than the boiling point of the solvent used (water). In general, this can be carried out by slowly drying in an oven at 100° C. or below for more than 1 hour. When the catalyst is dried for the longest time at 80° C., the catalyst, which has been dried for about 12 hours, can be sintered by raising the temperature up to 550° C. at a heating speed of 1° C./min in the air and maintaining the same temperature for about 3 hours.

Preferably, the step can be carried out by mixing the mesoporous silica powder with the aqueous solution containing the cobalt precursor and zirconium and/or aluminum precursor to form a gel, followed by drying and calcination of the gel in the air.

When the mesoporous template used as a hard template remains in the structure, the mesostructure cannot be made, and thus it must be removed.

In order to chemically remove the silica, a strong base or a strong acid solution is generally used, and the use of NaOH and HF is most common and general. Considering the usability and the risk of use, NaOH, which is a strong base, can be used to remove the template, and the template may be removed by repetitive washing with a NaOH solution at a concentration of 2 M after the preparation thereof.

According to one embodiment of the present invention, the catalyst, which is prepared using KIT-6 as a template, is a mesoporous hybrid cobalt metal oxide (meso-$CoZr_{0.25}O_x$, meso-$CoAl_{0.25}O_x$) having mesopores of highly-ordered and uniform size and shows the specific surface area of about 45 $m^2/g$ to 75 $m^2/g$, and the specific surface area tends to significantly decrease compared to that of KIT-6 used as a template. However, the main framework of the catalyst is composed of cobalt oxide ($Co_3O_4$), zirconia ($ZrO_2$), alumina ($Al_2O_3$), and other oxide mixtures of cobalt-zirconia or cobalt-alumina, and thus, the catalyst has a larger number of active sites compared to a conventional catalyst having a wide specific surface area in which the active materials are uniformly dispersed on the surface of a support. It may also be advantageous in terms of mass transfer. Further, the structural stability of the catalyst can be highly outstanding compared to the meso-cobalt-based catalyst (meso-$Co_3O_4$) in which the main framework is only composed of cobalt oxide ($Co_3O_4$). Due to such increases in enhanced mass transfer and the mesostructure stability, it can be confirmed that the catalyst of the present invention shows an excellent activity and stability towards the Fischer-Tropsch compared to general the meso-catalyst or conventional cobalt catalysts.

The method for preparing the mesoporous cobalt-based catalyst for the Fischer-Tropsch synthesis according to the present invention may further include step (4) of further impregnating alumina as a structural promoter inside of the pores of the main framework of a mesoporous structure in which cobalt oxide and zirconia and/or alumina are uniformly mixed.

Step (4) may be carried out by impregnating, drying, and calcination the mesoporous structure prepared in the previous step in an alumina precursor solution.

The alumina ($Al_2O_3$) used as a structural promoter may be uniformly added on the surface of the catalyst using a general impregnation method, and the metal precursor of alumina (aluminum) acting as a structural promoter may be an aqueous solution of precursors of a chloride salt, nitrate, and carboxylate of a metal.

The structural promoter used in the present invention may be impregnated in an amount of 2% to 12% relative to the total weight of the catalyst, in order to prevent the effect of inhibiting reactivity of the catalyst by adhering to most parts of the active sites on the surface of the catalyst.

During the process of impregnating the structural promoter, the drying following the mixing of the aluminum aqueous solution with the catalyst can be slowly carried out at 70° C. to 90° C. for 6 hours to 24 hours, and the calcination process thereafter can be carried out by raising the temperature up to 550° C. from room temperature at a heating speed of 1° C./min and maintaining the same temperature for 3 hours.

The method for preparing the mesoporous cobalt-based catalyst according to the present invention may further include step (5) of further impregnating platinum precursor after step (4). The platinum precursor used in step (5) may be selected from the group consisting of tetraammineplatinum nitrate, platinum dichloride, platinum acetylacetonate, diammine dinitro platinum, and sodium hexachloroplatinate hexahydrate.

Meanwhile, the present invention provides a method for preparing middle distillate-based liquid hydrocarbons (clean liquid fuel such as diesel, gasoline, etc.) from syngas ($H_2$+CO) by the low-temperature Fischer-Tropsch synthesis using the catalyst according to the present invention.

Therefore, the method for preparing middle distillate-based liquid hydrocarbons from syngas by the low-temperature Fischer-Tropsch synthesis comprises i) applying the mesoporous cobalt-based catalyst for the Fischer-Tropsch synthesis having a main framework of a mesoporous structure, in which cobalt oxide and zirconia and/or alumina are uniformly mixed according to the present invention, to a fixed-bed reactor for Fischer-Tropsch synthesis;

ii) activating the catalyst by reduction under a high-temperature hydrogen atmosphere; and iii) carrying out the Fischer-Tropsch synthesis using the activated catalyst for the low-temperature Fischer-Tropsch synthesis.

The F-T synthesis is a key technology for the GLT technology, which is a process of converting syngas into linear paraffin-based hydrocarbons via a chain growth reaction using iron or cobalt catalysts. The low-temperature Fischer-Tropsch synthesis using cobalt-based catalysts mainly forms linear paraffin-based hydrocarbons, but alpha-olefins in the form of a double bond or an alcohol are produced as by-products in the side reactions. Further, the methanation reaction, which reverses syngas to methane, or carbon deposition reaction, which decreases the catalytic activity, may occur as an unfavorable side reaction, but liquid hydrocarbons can be produced in a larger amount with the use of the catalyst according to the present invention.

Step i) may further include a diluent when the mesoporous cobalt-based catalyst for the Fischer-Tropsch synthesis is applied to the fixed-bed reactor.

The diluent has a role in protecting the catalyst from thermal shock by easily emitting reaction heat generated during the Fischer-Tropsch synthesis out of the reactor by heat dissipation, and the catalyst and the diluent may be added in a weight ratio of 1:1 to 1:10.

The diluent may be at least one selected from the group consisting of an $\alpha$-$Al_2O_3$ powder, $\alpha$-$Al_2O_3$ ball, and zirconia ball.

Step ii) carries out a pre-treatment process for reduction of cobalt oxide, which consists of the main framework of the mesoporous catalyst, before carrying out the low-temperature Fischer-Tropsch synthesis. The pre-treatment process may be carried out for 6 hours to 24 hours, preferably for about 12 hours under $H_2(5\%)/N_2$ reducing gas. When the cobalt oxide present in the framework of the catalyst is subjected to pre-treatment under hydrogen at 400° C., a significant portion of cobalt oxide is converted to cobalt metal, thereby showing an activity towards the Fischer-Tropsch synthesis, and this was analytically confirmed by experiments. It was confirmed by reaction results and analysis results after the reaction that the mesostructure is stably maintained in the presence of the promoter which was loaded onto the surface of the catalyst by impregnation.

When reducing metal oxides are subjected to reduction under high-temperature hydrogen, a phase transition from the metal oxides to transition metals, which are active materials, occurs, and thereafter, the transition metals are subjected to the low-temperature Fischer-Tropsch synthesis for about 60 hours under syngas with a volume fraction of $H_2/N_2/CO$=62.84/5.60/31.56. When the catalyst, in which the mesoporous structure according to the present invention is stably maintained, is used, a polymerization of carbon chains from carbons of carbon monoxide (CO) is initiated to produce hydrocarbons having various distributions of number of carbons, and the CO conversion was maintained over 70% even after the steady state had been reached.

Preferably, the Fischer-Tropsch synthesis in step iii) above is carried out at 200° C. to 350° C., under a reaction pressure of 10 bar to 30 bar, and at a space velocity of 8000 L/kg·cat./h to 64000 L/kg·cat./h. If the low-temperature Fischer-Tropsch synthesis is specifically applied in the method for preparing middle distillate-based liquid hydrocarbon from syngas, the reaction temperature may preferably be 230° C. to 250° C., and the reaction pressure of the Fischer-Tropsch synthesis may be 15 bar to 35 bar based on the pressure in the reactor by syngas that flows inside of the reactor, and may preferably be 20 bar.

The reactions may be carried out in a fixed-bed reactor as a synthesis reactor, but are not limited thereto.

Advantageous Effects

In the case of the mesoporous cobalt-based catalyst according to the present invention, the cobalt-non-reducing metal oxides are used as a main framework of the catalyst, and at the same time, all catalysts serve as an active site, thereby increasing the number of active sites, unlike the conventional catalysts, in which cobalt is impregnated on a support with a large surface area. Thus, the catalyst of the present invention has a larger number of active sites compared to a catalyst in which active materials are uniformly dispersed on the surface of a support having a wide specific surface area and can be advantageous in terms of mass transfer. Further, the catalyst can also be advantageous in that the problem associated with having a high activity only when the interaction between the conventional support and the active metal is minimized may no longer be considered.

The mesoporous cobalt-based catalyst according to the present invention can stably maintain the mesoporous structure under a high-temperature $H_2$-rich reduction condition and the low-temperature Fischer-Tropsch synthesis, and due to the structure stability, the reactants can easily be delivered to the active sites of the catalyst and the release of heavier hydrocarbon products is facilitated after the production thereof. Further, unlike the conventional cobalt-based catalysts which are prepared by adding various co-catalysts for the purpose of improving reducibility, activity, and selectivity and increasing thermal stability, the mesoporous cobalt-based catalyst for the Fischer-Tropsch synthesis can constantly maintain the CO conversion and selectivity of heavier hydrocarbons at high levels without further requiring co-catalysts, and thus it can be very effectively used for the Fischer-Tropsch synthesis.

BRIEF DESCRIPTIONS OF THE DRAWINGS

FIG. 1 is a diagram showing the CO conversion data with TOS (Time On Stream) during the reaction time of 60 hours for the catalyst according to Example 3, Example 6, and Comparative Example 1. In the case in which the meso framework was substituted with an oxide, and $Al_2O_3$ was used as a structural promoter, it was confirmed that the significantly stable catalytic activity was constantly maintained during the reaction time of 60 hours.

FIG. 2 is a diagram showing XRD measurement results which confirm the crystal structure of the catalyst in Example 3, Example 6, and Comparative Example 1 according to one embodiment.

FIG. 3 is a diagram showing SEM measurement results of the catalyst in Example 3, Example 6, and Comparative Example 1 according to one embodiment.

FIG. 4 is a diagram comparing pore volume relative to pore diameter of the catalyst in Example 3, Example 6, and Comparative Example 1 according to one embodiment.

DETAILED DESCRIPTION OF THE INVENTION

The present invention will be described in detail with accompanying examples hereinbelow. However, the Examples disclosed herein are only for illustrative objects and should not be construed as limiting the scope of the present invention.

Preparation Example 1: Preparation of Mesoporous Silica (KIT-6)

In order to use KIT-6 as a hard template for the mesoporous cobalt-metal oxide hybrid catalyst (meso-$CoZr_{0.25}O_x$, meso-$CoAl_{0.25}O_x$), the KIT-6 was prepared as follows.

16.0 g of pluronic p123 copolymer, as the organic structure directing agent which forms three-dimensional mesoporous silica structure by forming micelles in an aqueous solution, was mixed with 150 ml of distilled water and was stirred until completely dissolved in the distilled water. Then, 25 ml of a 37% hydrochloric aqueous solution was mixed with 428 ml of distilled water and stirred by adjusting the internal temperature to 35° C. After confirming that the pluronic p123 copolymer aqueous solution prepared above was completely dissolved in the distilled water, the solution was poured into the hydrochloric solution, being stirred and mixed therewith. The mixed solution was then stirred for about 10 minutes, and 16.0 g of n-butanol was added to the mixed solution while stirring. The resultant was further stirred for 1 hour while maintaining the reaction temperature at 35° C., and thereafter, 34.4 g of TEOS (tetraethoxysilane) was added at once to the reaction solution being stirred, and the resultant was mildly stirred for 24 hours at the reaction temperature of 35° C.

After the 24-hour stirring was completed, the production of white silica precipitation in the reaction solution was confirmed. The solution was then transferred to an autoclave equipped with Teflon containers, and hydrothermal synthesis was carried out using the pressure naturally generated for 24 hours at 100° C. without stirring. The reaction solution after the hydrothermal reaction was filtered without washing process before it was completely cooled, the remaining solvent was sufficiently removed by the filtration, and the resultant was dried for 1 hour in an oven at 110° C. A mixed solution of 30 ml of a 37% hydrochloric acid aqueous solution and 300 ml of ethanol was prepared, and the white powder was mixed with the hydrochloric acid solution after drying. The resultant was then stirred for about 2 hours to remove the pluronic p 123 copolymer used as a structure forming agent, that is, surfactant extraction was carried out. After stirring, the solution was washed with distilled water and dried in an oven at 110° C. for about 1 hour to 2 hours. The white powder after drying was calcined by raising the heating temperature to 550° C. at a heating speed of 1° C./min and maintaining the temperature for 6 hours, and finally KIT-6 mesoporous silica in the form of a fine white powder was prepared. It was confirmed that the specific surface area of the prepared KIT-6 was 631 $m^2/g$ and the average pore size thereof was 5.8 nm.

Example 1: Preparation of Mesoporous Cobalt Zirconia (Meso-$CoZr_{0.25}O_x$) Catalyst 10.0 g of KIT-6 prepared in the preparation Example 1 was dried in an oven at 110° C. for about one hour to eliminate the remaining moisture. 9.5 g of cobalt nitrate hexahydrate (97.0%), which is a cobalt precursor, and 2.3 g of zirconium nitrate oxide dihydrate (99.0%), which is a zirconium precursor, were added to about 10.0 g of distilled water and completely dissolved. The solution containing the cobalt and zirconium precursors was added at once to the KIT-6 powder after drying and mixed for a sufficient amount of time to allow the solution of precursors to infiltrate into the inside of the pores. Scarlet-colored KIT-6 powder, in which the solution of precursors is well mixed, was dried at 80° C., which is lower than the boiling point of distilled water, the solvent, for 12 hours, and underwent slow evaporation of water, which is the solvent. After drying, the powder was calcined by raising the heating temperature to 550° C. at a heating speed of 1° C./min and maintaining the temperature for 3 hours.

After calcination, a 2 M NaOH aqueous solution was prepared for the treatment of a strong base as a step of removing KIT-6 (template extraction). About 32.8 g of NaOH powder was added to 400 ml of distilled water and was completely dissolved to prepare a strong base aqueous solution, and the cobalt-zirconia powder mixed with sintered KIT-6 was added to 200 ml of the prepared 2 M NaOH aqueous solution and slowly stirred for about 30 minutes. After stirring for 30 minutes, the catalyst solution was centrifuged for 10 minutes at 9000 rpm to separate and release the base solution from the catalyst, and the catalyst was washed with 200 ml of the 2 M NaOH aqueous solution for the second time and underwent additional washing for a total of four times each with distilled water and acetone twice. Since the powder of the prepared mesoporous cobalt-zirconia (meso-$CoZr_{0.25}O_x$) catalyst is very fine, the washing process was repetitively carried out using a centrifugation instead of using a filter. After washing, the catalyst was dried at room temperature for 2 days and collected to finally prepare the mesoporous cobalt-zirconia catalyst.

Example 2: Preparation of $Al_2O_3(5)$/Meso-$CoZr_{0.125}O_x$ Catalyst (1) Step 1: Preparation of Mesoporous Cobalt-Zirconia Catalyst (Meso-$CoZr_{0.125}O_x$)

The mesoporous cobalt-zirconia catalyst (meso-$CoZr_{0.125}O_x$) was obtained in the same way as described in Example 1 except that 1.1 g of zirconium nitrate oxide dihydrate was used instead of 2.3 g.

(2) Step 2: Preparation of $Al_2O_3(5)$/Meso-$CoZr_{0.125}O_x$ Catalyst 5.0% of alumina ($Al_2O_3$) relative to the weight of the mesoporous cobalt-zirconia catalyst (meso-$CoZr_{0.125}O_x$) as a promoter ingredient was impregnated in the mesoporous cobalt-zirconia catalyst (meso-$CoZr_{0.125}O_x$) prepared in step 1 above.

1.2 g of aluminum nitrate nonahydrate (98.0%), which is an aluminum precursor, was dissolved in about 2 g of distilled water. 3 g of the prepared mesoporous cobalt-zirconia catalyst (meso-$CoZr_{0.125}O_x$) was initially dried for about 1 hour in an oven at 110° C. to eliminate moisture. A solution containing the aluminum precursor was added to the mesoporous cobalt-zirconia catalyst (meso-$CoZr_{0.125}O_x$) after drying to prepare a mesoporous cobalt-zirconia catalyst in which the alumina is added by 5% relative to the weight of the catalyst by wet impregnation. The catalyst powder mixed with the aluminum precursor was slowly dried for about 12 hours in an oven at 80° C. to evaporate distilled water, which is the solvent. The catalyst after drying was collected and calcined by raising the heating temperature to 550° C. at a heating speed of 1° C./min and maintaining the temperature for 3 hours. The catalyst prepared above was denoted as $Al_2O_3(5)$/meso-$CoZr_{0.125}O_x$, and it was confirmed that the specific surface area of the catalyst prepared was 73.4 m$^2$/g and the average pore size was 3.9 nm.

Example 3: Preparation of $Al_2O_3(5)$/Meso-$CoZr_{0.25}O_x$ $Al_2O_3(5)$/meso-$CoZr_{0.25}O_x$ was obtained in the same way as described in Example 2 except that a mesoporous cobalt-zirconia catalyst (meso-$CoZr_{0.25}O_x$) was used.

It was confirmed that the specific surface area of the prepared catalyst was 74.9 m$^2$/g and the average pore size was 5.9 nm.

Example 4: Preparation of $Al_2O_3(5)$-Pt(1)/Meso-$CoZr_{0.25}O_x$ 3 g of the mesoporous cobalt-zirconia catalyst ($Al_2O_3(5)$/meso-$CoZr_{0.25}O_x$) obtained in Example 3 was initially dried for about 1 hour in an oven at 110° C. to eliminate moisture.

A solution containing a platinum precursor, in which 0.06 g of tetraammineplatinum nitrate (99.99%) was dissolved in about 2 g of distilled water, was added to the mesoporous cobalt-zirconia catalyst ($Al_2O_3(5)$/meso-$CoZr_{0.25}O_x$) after drying to prepare a mesoporous cobalt-zirconia catalyst in which the platinum was added by 1% relative to the weight of the catalyst by wet impregnation. The catalyst powder mixed with the platinum precursor solution was slowly dried for about 12 hours in an oven at 80° C. to evaporate distilled water, which is the solvent. The catalyst was collected after drying and calcined by raising the heating temperature to 550° C. at a heating speed of 1° C./min and maintaining the temperature for 3 hours to obtain an $Al_2O_3(5)$-Pt(1)/meso-$CoZr_{0.25}O_x$ catalyst. It was confirmed that the specific surface area of the catalyst prepared was 55.0 m$^2$/g and the average pore size was 7.2 nm.

Example 5: Preparation of $Al_2O_3(5)$/Meso-$CoAl_{0.125}O_x$ Catalyst

(1) Step 1: Preparation of Mesoporous Cobalt-Alumina Catalyst (Meso-$CoAl_{0.125}O_x$)

The mesoporous cobalt-alumina catalyst (meso-$CoAl_{0.125}O_x$) was obtained in the same way as described in Example 1 except that 1.6 g of aluminum nitrate nonahydrate (98.0%) was used.

(2) Step 2: Preparation of $Al_2O_3(5)$/Meso-$CoAl_{0.125}O_x$

The $Al_2O_3(5)$/meso-$CoAl_{0.125}O_x$ catalyst was obtained in the same way as described in Example 2 except that the mesoporous cobalt-alumina catalyst (meso-$CoAl_{0.125}O_x$) prepared in step (1) above was used instead of an $Al_2O_3(5)$/meso-$CoZr_{0.125}O_x$ catalyst.

It was confirmed that the specific surface area of the catalyst prepared was 68.1 m$^2$/g and the average pore size was 4.7 nm.

Example 6: Preparation of $Al_2O_3(5)$/Meso-$CoAl_{0.25}O_x$ Catalyst

(1) Step 1: Preparation of Mesoporous Cobalt-Alumina Catalyst (Meso-$CoAl_{0.25}O_x$)

The mesoporous cobalt-alumina catalyst (meso-$CoAl_{0.25}O_x$) was obtained in the same way as described in Example 1 except that 3.2 g of the aluminum nitrate nonahydrate was used.

(2) Step 2: Preparation of $Al_2O_3(5)$/Meso-$CoAl_{0.25}O_x$

The $Al_2O_3(5)$/meso-$CoAl_{0.25}O_x$ catalyst was obtained in the same way as described in Example 2 except that the mesoporous cobalt-alumina (meso-$CoAl_{0.25}O_x$) prepared in step (1) above was used instead of an $Al_2O_3(5)$/meso-$CoZr_{0.125}O_x$ catalyst.

It was confirmed that the specific surface area of the catalyst prepared was 46.9 m$^2$/g and the average pore size was 5.5 nm.

Comparative Example 1: Preparation of Mesoporous Cobalt Catalyst (Meso-$Co_3O_4$)

The mesoporous cobalt catalyst (meso-$Co_3O_4$) was obtained in the same way as described in Example 1 except that 9.5 g of cobalt nitrate hexahydrate, which is a cobalt precursor, was used without a zirconium precursor. It was confirmed that the specific surface area of the catalyst prepared was 104 m$^2$/g and the average pore size was 5.0 nm.

Comparative Example 2: Preparation of $Al_2O_3(5)$/Meso-$CoZr_{0.375}O_x$ Catalyst

(1) Step 1: Preparation of Mesoporous Cobalt-Zirconia Catalyst (Meso-$CoZr_{0.375}O_x$)

The mesoporous cobalt-zirconia catalyst (meso-$CoZr_{0.375}O_x$) was obtained in the same way as described in Example 1 except that 3.4 g of zirconium nitrate oxide dehydrate was used instead of 2.3 g of the same.

(2) Step 2: Preparation of $Al_2O_3(5)$/Meso-$CoZr_{0.375}O_x$ Catalyst

The $Al_2O_3(5)$/meso-$CoZr_{0.375}O_x$ catalyst was obtained in the same way as described in Example 1 except that the mesoporous cobalt-zirconia catalyst (meso-$CoZr_{0.375}O_x$) prepared in step (1) was used instead of the meso-$CoZr_{0.25}O_x$ catalyst.

It was confirmed that the specific surface area of the catalyst prepared was 21.2 m²/g and the average pore size was 4.9 nm.

Comparative Example 3: Preparation of $Al_2O_3(5)$/Meso-$CoZr_{0.5}O_x$ Catalyst (1) Step 1: Preparation of Mesoporous Cobalt Zirconia Catalyst (Meso-$CoZr_{0.5}O_x$)

The mesoporous cobalt-zirconia catalyst (meso-$CoZr_{0.5}O_x$) was obtained in the same way as described in Example 1 except that 4.6 g of zirconium nitrate oxide dehydrate was used instead of 2.3 g of the same.

(2) Step 2: Preparation of $Al_2O_3(5)$/Meso-$CoZr_{0.5}O_x$ Catalyst

The $Al_2O_3(5)$/meso-$CoZr_{0.5}O_x$ catalyst was obtained in the same way as described in Example 2 except that the mesoporous cobalt-zirconia catalyst (meso-$CoZr_{0.5}O_x$) prepared in step (1) above was used instead of the meso-$CoZr_{0.25}O_x$ catalyst.

It was confirmed that the specific surface area of the catalyst prepared was 61.0 m²/g and the average pore size was 6.2 nm.

Comparative Example 4: Preparation of $Al_2O_3(5)$/Meso-$CoAl_{0.5}O_x$ Catalyst (1) Step 1: Preparation of Mesoporous Cobalt-Alumina Catalyst (Meso-$CoAl_{0.5}O_x$)

The mesoporous cobalt-alumina catalyst (meso-$CoAl_{0.5}O_x$) was obtained in the same way as described in Example 1 except that 6.5 g of the aluminum nitrate nonahydrate was used instead of 2.3 g of zirconium nitrate oxide dehydrate.

(2) Step 2: Preparation of $Al_2O_3(5)$/meso-$CoAl_{0.5}O_x$ Catalyst

The $Al_2O_3(5)$/meso-$CoAl_{0.5}O_x$ catalyst was obtained in the same way as described in Example 1 except that the mesoporous cobalt-alumina catalyst (meso-$CoAl_{0.5}O_x$) prepared in step (1) above was used instead of the meso-$CoZr_{0.25}O_x$ catalyst.

Comparative Example 5: Preparation of $Al_2O_3(5)$/Meso-$CoLa_{0.5}O_x$ Catalyst (1) Step 1: Preparation of Mesoporous Cobalt-Lanthania Catalyst (Meso-$CoLa_{0.5}O_x$)

The mesoporous cobalt-lanthania catalyst (meso-$CoLa_{0.5}O_x$) was obtained in the same way as described in Example 1 except that 7.4 g of lanthanum nitrate hexahydrate (99.99%) was used instead of 2.3 of zirconium nitrate oxide dehydrate.

(2) Step 2: Preparation of $Al_2O_3(5)$/Meso-$CoLa_{0.5}O_x$ Catalyst

The $Al_2O_3(5)$/meso-$CoLa_{0.5}O_x$ catalyst was obtained in the same way as described in Example 1 except that the mesoporous cobalt-lanthania catalyst (meso-$CoLa_{0.5}O_x$) prepared in step (1) above was used instead of the meso-$CoZr_{0.25}O_x$ catalyst.

Comparative Example 6: Preparation of $Al_2O_3(5)$/Meso-$CoSm_{0.25}O_x$ Catalyst (1) Step 1: Preparation of Mesoporous Cobalt-Samaria Catalyst (Meso-$CoSm_{0.25}O_x$)

The mesoporous cobalt-samaria catalyst (meso-$CoSm_{0.25}O_x$) was obtained in the same way as described in Example 1 except that 3.8 g of samarium nitrate hexahydrate (99.9%) was used instead of 2.3 of zirconium nitrate oxide dehydrate.

(2) Step 2: Preparation of $Al_2O_3(5)$/Meso-$CoSm_{0.25}O_x$ Catalyst

The $Al_2O_3(5)$/meso-$CoSm_{0.25}O_x$ catalyst was obtained in the same way as described in Example 2 except that the mesoporous cobalt-samaria catalyst (meso-$CoSm_{0.25}O_x$) prepared in step (1) above was used instead of the meso-$CoZr_{0.25}O_x$ catalyst.

Comparative Example 7: Preparation of $Al_2O_3(5)$/Meso-$CoMn_{0.25}O_x$ Catalyst (1) Step 1: Preparation of Mesoporous Cobalt-Manganese Oxide Catalyst (Meso-$CoMn_{0.25}O_x$)

The mesoporous cobalt-manganese oxide catalyst (meso-$CoMn_{0.25}O_x$) was obtained in the same way as described in Example 1 except that 1.7 g of manganese chloride tetrahydrate (99.0%) was used instead of 2.3 g of zirconium nitrate oxide dehydrate.

(2) Step 2: Preparation of $Al_2O_3(5)$/meso-$CoMn_{0.25}O_x$ Catalyst

The $Al_2O_3(5)$/meso-$CoMn_{0.25}O_x$ catalyst was obtained in the same way as described in Example 2 except that the mesoporous cobalt-manganese oxide catalyst (meso-$CoMn_{0.25}O_x$) prepared in step (1) above was used instead of the meso-$CoZr_{0.25}O_x$ catalyst.

Experimental Example

In order to confirm the activity of the catalysts prepared in Examples 1 to 6 and Comparative Examples 1 to 7 for the low-temperature Fischer-Tropsch synthesis, the CO conversion and hydrocarbon selectivity were repeatedly analyzed. The reaction was carried out using syngas with a volume fraction of $H_2/N_2/CO=62.84/5.60/31.56$ with reaction conditions of T=230° C. to 250° C., P=20 bar, the space velocity of 8000 L/kg·cat./h to 24,000 L/kg·cat./h for 60 hours, and the activity of the catalysts were measured by the average after the reaction time of 50 hours.

Degree of deactivation (%)=[CO conversion(maximum)−CO conversion(50 hours)]/CO conversion(maximum)×100

Experimental Example 1

Reaction experiments were performed using the catalysts prepared in Examples 1 to 3, 5, and 6 and Comparative Examples 1 and 2.

Prior to the activity tests, the catalysts were reduced at 400° C. for 12 hours under reducing gas of $H_2(5\%)/N_2$ at a flow rate of 33 cm$^3$/min.

0.1 g of the prepared catalyst and 1.0 of common puralox α-$Al_2O_3$ as a diluent were mixed and placed in a fixed-bed reactor in which the pressure was 20 bar based on the pressure of the syngas, the space velocity as 24000 L/kg·cat./h, and the temperature was 240° C., under the flow of syngas ($H_2$+CO) at a flow rate of 39.999 ml/min, and the reaction experiments were thereby performed (refer to Table 1). The reaction was a continuous reaction which was carried out for about 60 hours, and the CO conversion and hydrocarbon selectivity for the reaction products were repeatedly analyzed using gas chromatography at 1 hour intervals. The results are shown in Table 2 below.

TABLE 1

| Space velocity (L/kg · cat./h) | Temperature of fixed-bed reactor (° C.) | Dilution ratio (catalyst:diluent) | Flow rate of syngas (ml/min) |
|---|---|---|---|
| 24000 | 240 | 1:10 | 39.999 |

TABLE 2

| Catalyst | | CO conversion (carbon mole %)* | | Degree of deactivation (%)** | Carbon selectivity $C_1/C_2$-$C_4/C_{5+}$ (carbon mole %) (average) |
|---|---|---|---|---|---|
| | | maximum | After 50 hours of reaction | | |
| Example 1 | meso-$CoZr_{0.25}O_x$ | 100.0 | 100.0 | 0.0 | 8.6/7.5/79.5 |
| Example 2 | $Al_2O_3(5)$/meso-$CoZr_{0.125}O_x$ | 99.8 | 95.6 | 4.2 | 12.5/9.2/75.9 |
| Example 3 | $Al_2O_3(5)$/meso-$CoZr_{0.25}O_x$ | 100.0 | 100.0 | 0.0 | 9.4/6.8/80.1 |
| Example 5 | $Al_2O_3(5)$/meso-$CoAl_{0.125}O_x$ | 97.9 | 90.5 | 7.6 | 6.3/5.4/87.5 |
| Example 6 | $Al_2O_3(5)$/meso-$CoAl_{0.25}O_x$ | 100.0 | 84.8 | 15.2 | 12.2/8.9/77.7 |
| Comparative Example 1 | meso-$Co_3O_4$ | 99.5 | 27.8 | 72.1 | 5.0/10.0/85.0 |
| Comparative Example 2 | $Al_2O_3(5)$/meso-$CoZr_{0.375}O_x$ | 7.2 | 2.8 | 61.1 | 19.9/17.6/62.5 |

Experimental Example 2

Reaction experiments were performed using the catalyst prepared in Example 3 above.

The CO conversion and hydrocarbon selectivity for the catalyst were repeatedly analyzed in the same way as described in Experimental Example 1 except for the conditions shown in Table 3. The results are shown in Table 4.

TABLE 3

| Space velocity (L/kg · cat./h) | Temperature of fixed-bed reactor (° C.) | Dilution ratio (catalyst:diluent) | Flow rate of syngas (ml/min) |
|---|---|---|---|
| 24000 | 230 | 1:10 | 39.999 |

TABLE 4

| catalyst | | CO conversion (carbon mole %)* | | Degree of deactivation (%)** | Carbon selectivity $C_1/C_2$-$C_4/C_{5+}$ (carbon mole %) (average) |
|---|---|---|---|---|---|
| | | maximum | After 50 hours of reaction | | |
| Example 3 | $Al_2O_3(5)$/meso-$CoZr_{0.25}O_x$ | 100.0 | 99.9 | 0.1 | 8.2/5.9/83.2 |

Experimental Example 3

Reaction experiments were performed using the catalyst prepared in Example 3 above.

The CO conversion and hydrocarbon selectivity for the catalyst were repeatedly analyzed in the same way as described in Experimental Example 1 except for the conditions shown in Table 5. The results are shown in Table 6.

TABLE 5

| Space velocity (L/kg · cat./h) | Temperature of fixed-bed reactor (° C.) | Dilution ratio (catalyst:diluent) | Flow rate of syngas (ml/min) |
|---|---|---|---|
| 24000 | 230 | 1:1 | 39.999 |

TABLE 6

| | catalyst | CO conversion (carbon mole %)* maximum | CO conversion (carbon mole %)* After 50 hours of reaction | Degree of deactivation (%)** | Carbon selectivity $C_1/C_2$-$C_4/C_{5+}$ (carbon mole %) (average) |
|---|---|---|---|---|---|
| Example 3 | $Al_2O_3(5)/$ meso-$CoZr_{0.25}O_x$ | 98.8 | 70.3 | 28.8 | 8.5/17.4/74.1 |

Experimental Example 4

Reaction experiments were performed using the catalysts prepared in Examples 3 and 4 above.

The CO conversion and hydrocarbon selectivity for the catalysts were repeatedly analyzed in the same way as described in Experimental Example 1 except for the conditions shown in Table 7. The results are shown in Table 8.

TABLE 7

| Space velocity (L/kg · cat./h) | Temperature of fixed-bed reactor (° C.) | Dilution ratio (catalyst:diluent) | Flow rate of syngas (ml/min) |
|---|---|---|---|
| 16000 | 230 | 1:1 | 26.666 |

TABLE 8

| | catalyst | CO conversion (carbon mole %)* maximum | CO conversion (carbon mole %)* After 50 hours of reaction | Degree of deactivation (%)** | Carbon selectivity $C_1/C_2$-$C_4/C_{5+}$ (carbon mole %) (average) |
|---|---|---|---|---|---|
| Example 3 | $Al_2O_3(5)/$ meso-$CoZr_{0.25}O_x$ | 99.6 | 98.0 | 1.6 | 12.5/19.7/67.8 |
| Example 4 | $Al_2O_3(5)$-Pt(1)/ meso-$CoZr_{0.25}O_x$ | 98.8 | 75.5 | 23.6 | 8.3/17.5/74.2 |

Experimental Example 5

Reaction experiments were performed using the catalysts prepared in Examples 3 and 6, and Comparative Examples 3 to 5 above.

The CO conversion and hydrocarbon selectivity for the catalysts were repeatedly analyzed in the same way as described in Experimental Example 1 except for the conditions shown in Table 9. The results are shown in Table 10.

TABLE 9

| Space velocity (L/kg · cat./h) | Temperature of fixed-bed reactor (° C.) | Dilution ratio (catalyst:diluent) | Flow rate of syngas (ml/min) |
|---|---|---|---|
| 8000 | 250 | 1:1 | 13.333 |

TABLE 10

| | catalyst | CO conversion (carbon mole %)* maximum | CO conversion (carbon mole %)* After 50 hours of reaction | Degree of deactivation (%)** | Carbon selectivity $C_1/C_2$-$C_4/C_{5+}$ (carbon mole %) (average) |
|---|---|---|---|---|---|
| Example 3 | $Al_2O_3(5)/$ meso-$CoZr_{0.25}O_x$ | 99.9 | 99.8 | 0.1 | 12.1/12.0/75.9 |
| Example 6 | $Al_2O_3(5)/$ meso-$CoAl_{0.25}O_x$ | 99.9 | 98.8 | 0.1 | 15.8/11.9/72.3 |
| Comparative Example 3 | $Al_2O_3(5)/$ meso-$CoZr_{0.5}O_x$ | 20.2 | 12.9 | 36.1 | 3.9/17.1/79.0 |
| Comparative Example 4 | $Al_2O_3(5)/$ meso-$CoAl_{0.5}O_x$ | 28.3 | 13.5 | 52.2 | 4.8/21.0/74.2 |
| Comparative Example 5 | $Al_2O_3(5)/$ meso-$CoLa_{0.5}O_x$ | 40.7 | 11.8 | 71.0 | 1.9/13.1/85.0 |

Experimental Example 6

Reaction experiments were performed using the catalysts prepared in Comparative Examples 6 to 7 above.

The CO conversion and hydrocarbon selectivity for the catalysts were repeatedly analyzed in the same way as described in Experimental Example 1 except for the conditions shown in Table 11. The results are shown in Table 12.

TABLE 11

| Space velocity (L/kg · cat./h) | Temperature of fixed-bed reactor (° C.) | Dilution ratio (catalyst:diluent) | Flow rate of syngas (ml/min) |
|---|---|---|---|
| 24000 | 250 | 1:10 | 39.999 |

TABLE 12

| catalyst | | CO conversion (carbon mole %)* | | Carbon selectivity |
|---|---|---|---|---|
| | | maximum | After 50 hours of reaction | Degree of deactivation (%)** | $C_1/C_2$-$C_4/C_{5+}$ (carbon mole %) (average) |
| Comparative Example 6 | $Al_2O_3(5)$/ meso-$CoSm_{0.25}O_x$ | 9.7 | 6.5 | 33.0 | 9.7/13.8/76.5 |
| Comparative Example 7 | $Al_2O_3(5)$/ meso-$CoMn_{0.25}O_x$ | 3.4 | 2.3 | 32.4 | 20.6/29.0/50.4 |

Upon overall review of Experimental Examples 1 to 6 above, in the cases where the mesoporous cobalt oxide catalysts, in which a non-reducing oxide was substituted in the mesoporous framework, were prepared (meso-$CoM_y$(M=Zr or Al)$O_x$) and where the mesoporous cobalt oxide catalysts, which were impregnated to contain $Al_2O_3$ in an amount of 2 wt % to 12 wt %, were prepared ($Al_2O_3(5)$/meso-$CoM_yO_x$(M=Zr or Al)$O_x$), a high CO conversion and low degree of deactivation were seen in most cases, as shown in Tables 2, 4, 6, 8, 10, and 12.

In contrast, even when a non-reducing oxide was not substituted in the mesoporous framework as in the meso-$Co_3O_4$ catalyst of Comparative Example 1, it was confirmed through experiments that the deactivation of the catalyst occurred rapidly due to collapse of the mesostructure during the reduction or reaction.

Therefore, when a non-reducing oxide (zirconia, alumina) was substituted with the mesoporous framework and the surface of the catalyst was impregnated with $Al_2O_3$, compared to the mesoporous cobalt catalyst which was simply prepared (Comparative Example 1), the mesoporous structure could be maintained even under a reducing atmosphere, and thus the activity of the catalyst could be stably secured.

Further, in the case of the mesoporous cobalt-metal oxide catalysts, $CoM_aO_b$ (M is Zr or Al, a or b is a molar ratio, wherein a and b are in the range of 0.1≤a≤0.35 and 1≤b≤4, respectively), which was prepared to prevent collapse of the mesostructure by adding aluminum oxide or zirconium oxide, etc., as a non-reducing oxide during the preparation process thereof, when a was within the above range, the catalysts (Examples 1 to 6) showed excellent activity and stability compared to the catalysts wherein a was a value outside of the range (Comparative Examples 2 to 4).

In addition, it was confirmed that even when lanthanum (La), manganese (Mn), samarium (Sm), etc. were used as the non-reducing oxide (Comparative Examples 5 to 7), the activity and the stability of the catalysts of the present invention could not be secured.

The invention claimed is:

1. A mesoporous cobalt-based catalyst for the Fischer-Tropsch synthesis comprising a main framework of a mesoporous structure, wherein the main framework of the mesoporous structure comprises components represented by Formula 1 below uniformly mixed:

$CoM_aO_b$ [Formula 1]

wherein M is Zr and/or Al; and
a or b is a molar ratio, wherein a and b are in the range of 0.1≤a≤0.35 and 1≤b≤4, respectively.

2. The mesoporous cobalt-based catalyst of claim 1, wherein the main framework has a highly-ordered mesoporous structure, wherein an average pore diameter is in the range of 4 nm to 8 nm.

3. The mesoporous cobalt-based catalyst of claim 1, wherein the specific surface area of the catalyst is in the range of 45 $m^2$/g to 200 $m^2$/g.

4. The mesoporous cobalt-based catalyst of claim 1, wherein alumina is further impregnated in the pores as a structural promoter, in the main framework of a mesoporous structure in which cobalt oxide, zirconia and/or alumina are uniformly mixed.

5. The mesoporous cobalt-based catalyst of claim 4, wherein alumina as a structural promoter is added in an amount of 2 wt % to 12 wt % relative to the total weight of the catalyst.

6. The mesoporous cobalt-based catalyst of claim 4, wherein platinum is further impregnated in the pores, in the main framework of a mesoporous structure.

7. The mesoporous cobalt-based catalyst of claim 1, wherein the main framework is made of $CoZr_aO_b$, $CoAl_aO_b$, $Al_2O_3$—$CoZr_aO_b$, $Al_2O_3$—$CoAl_aO_b$, $Al_2O_3$—Pt—$CoZr_aO_b$, or a mixture thereof (wherein a and b are in the range of 0.1≤a≤0.35 and 1≤b≤4, respectively).

8. A method for preparing a mesoporous cobalt-based catalyst for the Fischer-Tropsch synthesis according to claim 1, comprising:
(1) preparing a mixed solution in which a cobalt precursor, a zirconium precursor, and/or an aluminum precursor are dissolved;
(2) filling the inside of the pores of a mesoporous template with the mixed solution in step (1) followed by drying and calcination; and
(3) removing the mesoporous template to form the main framework of a mesoporous structure, wherein the main framework of the mesoporous structure comprises components represented by Formula 1 below uniformly mixed:

$CoM_aO_b$ [Formula 1]

wherein M is Zr and/or Al; and
a or b is a molar ratio, wherein a and b are in the range of 0.1≤a≤0.35 and 1≤b≤4, respectively.

9. The method of claim 8, wherein the method further comprises step (4) of further supporting alumina as a structural promoter inside of the pores of the main framework of a mesoporous structure.

10. The method of claim 9, wherein step (4) comprises impregnating, drying, and calcinating the main framework of a mesoporous structure formed in step (3) in a solution containing the aluminum precursor.

11. The method of claim 9, wherein the method further comprises step (5) of further supporting a platinum precursor after step (4).

12. The method of claim 11, wherein the platinum precursor used in step (5) is selected from the group consisting of tetraammineplatinum nitrate, platinum dichloride, platinum acetylacetonate, diammine dinitro platinum, and sodium hexachloroplatinate hexahydrate.

13. The method of claim 8, wherein the solvent for the mixed solution of step (1) is at least one selected from the group consisting of distilled water, methanol, ethanol, and ethylene glycol.

14. The method of claim 8, wherein the cobalt precursor is selected from the group consisting of cobalt chloride ($CoCl_2 \cdot 6H_2O$), cobalt acetate (($CH_3COO)_2Co \cdot 4H_2O$), and cobalt nitrate ($Co(NO_3)_2 \cdot 6H_2O$); a zirconium precursor is selected from the group consisting of zirconium oxynitrate hydrate ($ZrO(NO_3)_2 \cdot xH_2O$), zirconium chloride octahydrate ($ZrOCl_2 \cdot 8H_2O$), and zirconium acetate hydroxide (($CH_3CO_2)_xZr(OH)_y$); and an aluminum precursor is selected from the group consisting of aluminum nitrate nonahydrate ($Al(NO_3)_3 \cdot 9H_2O$), aluminum chloride hexahydrate ($AlCl_3 \cdot 6H_2O$), and aluminum acetate ($Al(OH)(C_2H_3O_2)_2$).

15. The method of claim 8, wherein the cobalt precursor, and the zirconium precursor and/or the aluminum precursor in step (1) are mixed in a weight ratio of 1:0.1 to 1:0.3.

16. A mesoporous cobalt-based catalyst made by the process of claim 8, wherein the main framework of the mesoporous structure is formed using a mesoporous template selected from the group consisting of KIT-6, SBA-15, SBA-16, MCM-41, MCM-48, HMS, AMS-8, AMS-10, FDU-1, FDU-2, and FDU-12.

17. A method of preparing middle distillate-based liquid hydrocarbons from syngas by a low-temperature Fischer-Tropsch synthesis, comprising:
   i) applying the mesoporous cobalt-based catalyst for the Fischer-Tropsch synthesis according to claim 1 to a fixed-bed reactor for the Fischer-Tropsch synthesis;
   ii) activating the catalyst by reducing under a high-temperature hydrogen atmosphere; and
   iii) carrying out the Fischer-Tropsch synthesis using the activated catalyst for the low-temperature Fischer-Tropsch synthesis.

18. The method of claim 17, wherein the low-temperature Fischer-Tropsch synthesis is carried out at a reaction temperature of 200° C. to 350° C. under a reaction pressure of 10 bar to 30 bar and at a space velocity of 8,000 L/kg·cat./h to 64,000 L/kg·cat./h.

* * * * *